Figure 1:
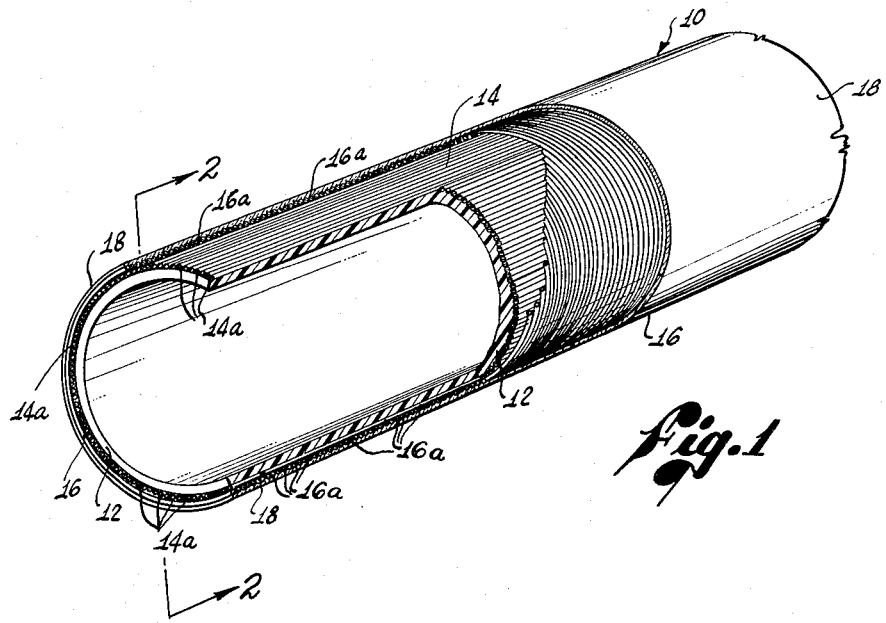

Oct. 3, 1961 R. L. NOLAND 3,002,534
REINFORCED THERMOPLASTICS
Filed Oct. 29, 1956

INVENTOR.
ROBERT L. NOLAND
BY
Fulwider Mattingly Huntley
ATTORNEYS

United States Patent Office 3,002,534
Patented Oct. 3, 1961

3,002,534
REINFORCED THERMOPLASTICS
Robert L. Noland, Norwalk, Calif., assignor, by mesne assignments, to Reinhold Engineering & Plastics Co., Inc., Marshallton, Del., a corporation of Delaware
Filed Oct. 29, 1956, Ser. No. 618,730
4 Claims. (Cl. 138—141)

This invention relates to reinforced plastic materials and relates especially to glass reinforced thermoplastics.

The highly chemically resistant thermoplastic materials such as the polyvinyl resins, have been and are employed for many industrial uses, but their relatively low tensile and compressive strengths, in comparison for example, with such materials as steel, have greatly restricted their scope of application. In addition, the softening point of many thermoplastics is quite low, being in the region of 140° to 200° F.

In order to utilize the highly chemically resistant thermoplastic materials, and to remedy the disadvantages of low tensile strength and low softening point, it has been proposed to reinforce plastic materials, as well as thermoplastics, by laminating glass-containing materials or glass filaments thereto. Since glass has an extremely high tensile strength and an extremely high melting temperature, it was thought that glass-reinforced plastic materials would provide a remedy. However, glass-reinforced thermoplastics have not been satisfactory for the reason that a method of achieving and maintaining a sufficiently high strength bond between the glass filaments and a thermoplastic pipe has heretofore not yet been devised.

It has also been proposed to impregnate glass fibers or filaments with various resins in order to obtain the favorable properties of both. However, resin-impregnated fiberglass has been found to absorb relatively large amounts of water which, after some time, greatly reduces the strength of the fiberglass to a point well below its original strength. While the resin itself is water resistant, complete impregnation of the glass fibers cannot be achieved by current impregnating processes and techniques. Consequently, in those structural and industrial applications where the material comes in contact with water and high strength properties are desired, resin impregnated glass fiber materials also do not provide a satisfactory solution.

Bearing in mind the foregoing facts, it is a major object of the present invention to provide a water resistant glass-reinforced thermoplastic material in which a structure is produced having an exceedingly high strength bond formed between the glass and the thermoplastic.

Another object of the present invention is to provide a reinforced layer of fiberglass bonded to a layer of thermoplastic material, the nature of the bonding produced being such that a composite structure is formed having a tensile strength substantially greater than the original tensile strength of the thermoplastic material itself.

It is a further object of the present invention to provide a reinforcing layer of fiberglass bonded to a layer of thermoplastic material, the nature of the bonding produced being such that a composite structure is formed having a softening point substantially above that of the original softening point of the thermoplastic material.

It is yet another object of the present invention to provide a glass reinforced thermoplastic pipe suitable for high temperature use and having a tensile strength substantially greater than that of the thermoplastic pipe itself.

A still further object of the present invention is to provide an adhesive material which produces a high strength bond between glass and thermoplastic material.

To achieve and maintain a structure between the reinforcing glass filaments and the thermoplastic material, the formation of a high strength bond, as mentioned, is a prerequisite and secondly, a positive means of controlling the rate of thermal expansion of the thermoplastic and glass material bonded thereto should also be provided for, if such controlling means is not provided, the thermoplastic material (having a substantially higher coefficient of thermal expansion than the glass) will move outwardly from the glass and greatly reduce the advantages of the high strength bond. Where pieces of reinforced thermoplastic materials are to be joined to each other, as for example, sections of reinforced thermoplastic pipe, it is especially important that the coefficients of thermal expansion in the longitudinal direction be accurately controlled in order to provide predetermined clearance between the points of juncture.

Accordingly, it is a second major object of the present invention to provide a glass-thermoplastic structure in which the coefficient of thermal expansion of the thermoplastic material and the glass is modified to the extent that the rate of thermal expansion of both the glass and thermoplastic material are substantially equalized.

A still further object of the present invention is to provide a means for achieving and maintaining a high strength bond between glass and thermoplastic materials and to provide means in conjunction with said high strength bond for modifying the coefficients of expansion of said thermoplastic and glass.

It is still another object of the present invention to provide a high strength, waterproof glass-thermoplastic pipe having glass fibers and thermoplastic materials highly bonded together so that the tensile strength and softening points of the thermoplastic material are substantially increased and so that the glass filaments wound about the thermoplastic materials from having dissimilar coefficients of thermal expansion in the longitudinal direction.

Figure 2:
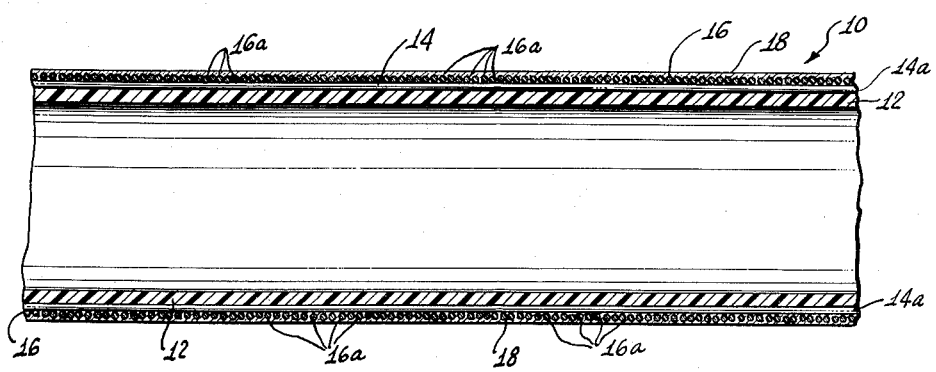

These and other objects and advantages of the present invention will become more clearly understood, by referring to the following description and accompanying drawings, in which:

FIGURE 1 is a partially sectioned perspective view of one preferred embodiment of my present invention; and FIGURE 2 is a cross-section along the line 2—2 of FIGURE 1.

Referring now to FIGURES 1 and 2, a reinforced thermoplastic pipe embodying my invention is designated by the numeral 10 and comprises an inner thermoplastic pipe 12, an intermediate wall 14 of longitudinal glass fibers or filaments 14a bonded thereto in a manner to be described, and an outer wall 16 of peripherally-wound glass fibers or filaments 16a. A weather-resistant cover or coating 18 of any suitable material such as water resistant polyvinyl chloride tape, may be applied to the outer wall 16, if external conditions so warrant.

The inner cylinder or pipe 12 is preferably made of a thermoplastic material that is highly water and corrosion resistant, its exact composition being determined by the liquid materials to be passed therethrough. An especially excellent group of thermoplastic materials that is both highly water resistant and resistant to strong alkalies, acids and most organic solvents, are the vinyl resins, an excellent example of this group being polyvinyl chloride.

The intermediate wall 14, composed of a mat of elongated parallel glass fibers or filaments 14a, is preferably resin-impregnated to prevent movement of the individual filaments as the mat is wound about the pipe 12, the filaments 14a preferably being placed parallel to the axis of the pipe 12. The outer peripheral wall, a glass mat layer 16, is composed preferably of a plurality of parallel resin impregnated glass filaments 16a and is wound about the intermediate wall 14 in a manner such that the glass filaments assume a position substantially normal to the axis of the pipe 12. As shown by the drawing and as is evident from the above and other parts of this specification, the axially disposed glass filaments are affixed directly to, as by winding upon, the outer wall of the thermoplastic cylinder; that is, said axial filaments and said outer wall are juxtaposed by means of the bonding adhesive. The resin which is impregnated in the glass fibers or filaments, is preferably of the epoxy class, although other resins, which have curing temperatures below the softening point of the thermoplastic, may be used as will be seen.

In order that the advantageous high tensile strength properties of the glass be utilized in the glass-reinforced pipe 10, a high strength bonding adhesive is employed in bonding the glass filaments of the intermediate mat 14 to the thermoplastic pipe 12. The high strength bonding adhesive is prepared by adding an amount of thermoplastic material, of substantially the same composition as the material of the pipe 12 to a portion of a resin, of substantially the same composition as the resin in the resin-impregnated glass fibers, along with a catalyst or hardener, and dissolving some or all the aforementioned ingredients in a solvent. The solution or mixture or liquid dispersion so formed, is then applied to the outer periphery of the pipe 12 and the intermediate and outer walls 14 and 16, respectively, are immediately wound thereabout, as above-described. It is not necessary that a mutual solvent for the above-named ingredients be employed, as it has been found that an excellent flowable adhesive is prepared by utilizing a relatively small proportion of a polyvinyl chloride solvent, such as methyl ethyl ketone, the remaining relatively insoluble resins being homogeneously mixed or dispersed throughout the polyvinyl chloride solvent. The bonding resin mixture or dispersion being homogeneous or uniform in composition, it is of course applied as a uniform composition, for example, to the outer periphery of pipe 12, before juxtaposing the fibers or filaments 14a and said outer periphery.

The adhesive is then cured at a relatively low temperature below the softening point of the pipe 10 in order to prevent softening and deformation thereof. The solvent is driven off and the resultant product has a substantially higher tensile strength and substantially higher resistance to heat. That is, the adhesive between the intermediate glass wall 14 and the pipe 12 fuses these two layers together to form a structure, and the resin between the intermediate and outer glass walls 14 and 16, respectively, is also cured to cause a high strength bond between these glass walls. In addition, the rate of thermal expansion of the pipe 10 in a longitudinal direction is greatly diminished, and, in effect, is controlled by the presence of the longitudinal glass filaments 14a which effectively prevent longitudinal movement of the thermoplastic pipe. The presence of these longitudinal filaments 14a is found to be more advantageous in controlling the coefficient of thermal expansion of the pipe 10 than other types of windings, such as, for example, helical windings. The effect of the high strength glass—thermoplastic bond and the longitudinal alignment of the glass filaments 14a in the intermediate wall 14 is to produce, upon a thermal rise, an inner pipe 12 that is substantially prevented from moving out from within the reinforcing glass, the result being that, upon a thermal rise, the thermoplastic pipe 12 exists in a state of compression and the intermediate glass wall 14 exists in a state of tension.

A composite or modified coefficient of expansion is thus provided so that a plurality of glass-reinforced thermoplastic pipe lengths may be joined without the danger of the inner thermoplastic pipe 12 moving out from within the intermediate glass wall 14 and at the same time the circular windings of the glass filaments 16a of the outer wall 16 are aligned to withstand hoop tensile stresses that may be set up within the pipe 10.

Specific examples of the bonding adhesive used in the bonding of a polyvinyl chloride pipe 12 to an epoxy-impregnated mat 14 of glass filaments 14a follow:

Example I 5 to 50 parts polyvinyl chloride resin,
45 to 85 parts epoxy resin such as Shell Epon 828,
10 to 15 parts of a hardener such as phenyl methyl diamine, to make
100 parts of material.

The above 100 parts of material are admixed into 5 to 15 parts of a polyvinyl chloride resin solvent such as methyl ethyl ketone.

Example II 5 to 50 parts polyvinyl chloride resin,
25 to 45 parts epoxy resin such as Bakelite 2774,
25 to 45 parts polyamide resin, for example, Versamide 115, manufactured by General Mills Corporation, to make
100 parts of material.

The 100 parts of material are then admixed into 5 to 15 parts of a polyvinyl chloride solvent such as methyl ethyl ketone.

Example III 5 to 50 parts polyvinyl chloride resin
50 to 90 parts polyester resin, for example MR–29C, manufactured by Marco Chemicals, Inc.
0.25 to 2 parts of a peroxide hardener, such as benzoyl peroxide, to make
100 parts of material.

The 100 parts of material are then admixed into 5 to 15 parts of a polyvinyl chloride solvent such as methyl ethyl ketone.

In all of the above examples, the adhesive mixtures formed were applied to the outer periphery of the polyvinyl chloride pipe 12 and the longitudinal resin-impregnated glass filaments 14a, as well as the outer glass wall 16, were then wound thereabout. The adhesive was cured by subjecting the pipe 10 to a temperature of 160° F. for approximately twelve hours. The solvent was driven off leaving only the hardened polyvinyl chloride containing resin.

A polyamide resin is employed, as outlined in Example II, as a catalyst, and eliminates the necessity of any other hardener. The polyamide is preferable to ordinary hardeners, such as an amine, inasmuch as the resultant hardened bond is much more flexible.

In Example III, a polyester resin is used in place of the epoxy resin of Examples I and II with good results. The curing temperature of the adhesive liquid remains the same.

The composite structure utilizing the adhesives of Examples I to III, as described above, has been temperature-cycled through a range of —70° F. to +250° F. without deleterious effect to the bond between the polyvinyl chloride and the glass.

The cured pipe 10 has a substantially higher tensile strength than the polyvinyl chloride pipe 12 alone. A 2.25 inch diameter polyvinyl chloride having a wall thickness of 0.065 inch pipe 9 will when alone, rupture at a pressure of approximately 350 p.s.i. at a temperature of 70° F. By addition of approximately 0.035 inch of thickness of fiberglass in the manner described, it is possible to increase the burst pressure to approximately 1600 p.s.i. Further test results show that at a temperature of 140° F., such a polyvinyl chloride pipe alone will rupture at an internal pressure of approximately 65 p.s.i., whereas with the composite structure I have obtained burst pressures in excess of 800 p.s.i. at 250° F.

By use of an epoxy resin or an epoxy-polyamide resin in conjunction with the polyvinyl chloride in solution, the softening point of the glass-reinforced polyvinyl chloride pipe 10 is substantially raised. For example, the polyvinyl chloride pipe used without reinforcement will deform when used at temperatures in excess of 140° F. and will hence be inoperative at such temperatures. With the composite structure formed in the above-described manner, it is possible to utilize operating temperatures as high as 250° F.

An epoxy bonding material may sometimes be used, in conjunction with the polyamide resin alone, that is, without a polyvinyl chloride resin in the adhesive solution, with good results. When using the combination of an epoxy-polyamide resin in the adhesive solution, the ratio by weight of the epoxy resin to the polyamide resin is preferably approximately 1:1. An example of an epoxy-polyamide adhesive solution follows:

*Example IV*

40–60 parts epoxy resin such as Bakelite 2774
40–60 parts polyamide resin such as Versamide 115, to make
100 parts. Add
5–15 parts solvent, such as methyl ethyl ketone.

The adhesive solution is applied in the manner previously described, and the reinforced pipe 10 is cured, as has been described.

It is thus seen that a resin impregnated glass reinforced thermoplastic material has been prepared having increased high tensile strength characteristics, a higher softening point, and a modified rate of thermal expansion, these highly advantageous and modified properties being caused by the use of an improved high strength bonding adhesive in conjunction with special alignment of glass filaments which reinforce it.

While one embodiment specifically has been shown herein and described, it is apparent that many changes and modifications may be made that lie within the scope of the invention. Therefore, I do not intend to be limited by the embodiment described herein, but only by the appended claims.

I claim:

1. A glass reinforced thermoplastic pipe which comprises: an inner cylinder of a thermoplastic material; a pulrality of substantially parallel and axially disposed resin-impregnated glass filaments affixed directly to the outer wall of said thermoplastic cylinder by a cured bonding material forming an interface therewith, said bonding material comprising said thermoplastic material and said resin of said resin-impregnated glass filaments said thermoplastic material and said resin being uniformly admixed in said bonding material, said axially disposed gla ss filaments and said outer wall being juxtaposed, said glass filaments having a substantially lower coefficient of expansion than said thermoplastic material and being so bonded to the inner cylinder as to exert a compressive force on the thermoplastic material as a thermal rise occurs to thereby place the inner cylinder in compression and the glass filaments in tension; and a peripheral winding of glass fibers around said longitudinal glass filaments to withstand hoop tensile stresses.

2. A glass reinforced thermoplastic pipe which comprises: a separate and distinct inner cylinder of polyvinyl chloride; a plurality of substantially parallel and axially disposed resin-impregnated glass filaments affixed directly to the outer wall of said inner cylinder by a cured bonding material, said axially disposed glass filaments and said outer wall being juxtaposed, said resin of said resin-impregnated glass filament being selected from the group consisting of epoxy, polyamide, and polyester resins, said cured bonding material initially comprising from about 5 to 50% of a polyvinyl chloride resin and from about 50% to 90% of a resin selected from the group consisting of epoxy, polyamide, and polyester resins and being a homogeneous admixture of said polyvinyl chloride and said selected resin; and a peripheral winding of glass fibers around said longitudinal glass filaments to withstand hoop tensile forces.

3. A glass reinforced thermoplastic pipe which comprises: a distinct inner cylinder of a thermoplastic material; a plurality of substantially parallel and axially disposed resin-impregnated glass filaments affixed directly to the outer wall of said thermoplastic cylinder by a cured bonding material comprising said thermoplastic material and said resin of said resin-impregnated glass filaments, said outer wall and said axially disposed glass filaments being juxtaposed, the resin of said resin-impregnated glass filaments being selected from the group consisting of epoxy, polyamide and polyester resins, said bonding material comprising a uniform admixture of said thermoplastic material and said selected resin, said glass filaments having a substantially lower coefficient of expansion than said thermoplastic material and being so bonded to the inner cylinder as to exert a compressive force on the thermoplastic material as a thermal rise occurs to thereby place the inner cylinder in compression and the glass filaments in tension; and a peripheral winding of glass fibers around said longitudinal glass filaments to withstand hoop tensile stresses.

4. A glass reinforced thermoplastic pipe which comprises: an inner cylinder of a polyvinyl thermoplastic material; a plurality of substantially parallel and axially disposed resin-impregnated glass filaments affixed directly to and juxtaposed with the outer wall of said thermoplastic cylinder by a cured bonding material comprising a homogeneous admixture of said polyvinyl thermoplastic material and said resin of said resin-impregnated glass filaments, the resin of said resin-impregnated glass filaments being selected from the group consisting of epoxy, polyamide and polyester resins, said glass filaments having a substantially lower coefficient of expansion than said thermoplastic material and being so bonded to the inner cylinder as to exert a compressive force on the thermoplastic material as a thermal rise occurs to thereby place the inner cylinder in compression and the glass filaments in tension; and a peripheral winding of glass fibers around said longitudinal glass filaments to withstand hoop tensile stresses.

References Cited in the file of this patent

UNITED STATES PATENTS

| | | |
|---|---|---|
| 2,147,772 | Kallander | Feb. 21, 1939 |
| 2,594,693 | Smith | Apr. 29, 1952 |
| 2,614,058 | Francis | Oct. 14, 1952 |
| 2,637,673 | Barnard | May 5, 1953 |
| 2,731,376 | Rusch | Jan. 17, 1956 |
| 2,742,931 | De Ganahl | Apr. 24, 1956 |
| 2,758,342 | Squires | Aug. 14, 1956 |
| 2,887,728 | Usab | May 26, 1959 |

FOREIGN PATENTS

| | | |
|---|---|---|
| 624,393 | Great Britain | June 7, 1949 |

OTHER REFERENCES

Publication: Modern Plastics, November 1950, pages 113, 114, 118, 120. (Copy in Div. 11. Class 138—Sub. 76.)

Publication: "Bonding," Modern Plastics, March 1956, pages 126, 128, 133, 134, 136, 137, and 244. (Copy in Class I. Sub. 154—Epoxy.)

Publication: "Polyamide-Epoxy Resin Combinations," The Chemical Age, Apr. 21, 1956, pages 893, 894. (Copy in Class 260—Sub. 24 Ep.)